United States Patent
Deforche et al.

(10) Patent No.: US 7,653,072 B2
(45) Date of Patent: Jan. 26, 2010

(54) OVERCOMING ACCESS LATENCY INEFFICIENCY IN MEMORIES FOR PACKET SWITCHED NETWORKS

(75) Inventors: Koen Deforche, Roeselare (BE); Geert Verbruggen, Zelik (BE); Luc De Coster, Bertem (BE)

(73) Assignee: Transwitch Corporation, Shelton, CT (US)

( * ) Notice: Subject to any disclaimer, the term of this patent is extended or adjusted under 35 U.S.C. 154(b) by 1230 days.

(21) Appl. No.: 10/494,848

(22) PCT Filed: Nov. 13, 2002

(86) PCT No.: PCT/US02/36278

§ 371 (c)(1),
(2), (4) Date: Sep. 3, 2004

(87) PCT Pub. No.: WO03/043272

PCT Pub. Date: May 22, 2003

(65) Prior Publication Data

US 2005/0025140 A1 Feb. 3, 2005

Related U.S. Application Data

(60) Provisional application No. 60/350,611, filed on Nov. 13, 2001.

(51) Int. Cl.
 H04L 12/28 (2006.01)
 G06F 13/00 (2006.01)
 G11C 8/00 (2006.01)

(52) U.S. Cl. .............. 370/401; 370/412; 711/154; 365/230.03

(58) Field of Classification Search ............... None
 See application file for complete search history.

(56) References Cited

U.S. PATENT DOCUMENTS

| 6,137,807 | A | 10/2000 | Rusu et al. ............. 370/429 |
| 6,493,347 | B2* | 12/2002 | Sindhu et al. ............ 370/401 |
| 6,697,362 | B1* | 2/2004 | Akella et al. ............ 370/389 |
| 6,757,791 | B1* | 6/2004 | O'Grady et al. .......... 711/154 |
| 6,917,620 | B1* | 7/2005 | Sindhu et al. ............ 370/401 |
| 7,032,082 | B1* | 4/2006 | Rahim et al. ............ 711/154 |
| 2002/0149989 | A1* | 10/2002 | Calvignac et al. ....... 365/230.03 |

* cited by examiner

*Primary Examiner*—Steven H Nguyen
(74) *Attorney, Agent, or Firm*—Gordon & Jacobson, PC

(57) ABSTRACT

A method buffering packets in a packet switching network (FIG. 5) includes receiving a packet from the network; splitting the packet into a plurality of PDUs; stripping at least some of the PDUs over a plurality of memory banks; (18) retrieving the PDUs from the memory banks: and at least temporarily storing the retrieved PDUs in the sequence they are to be transmitted. An apparatus for implementing the method is also disclosed.

14 Claims, 5 Drawing Sheets

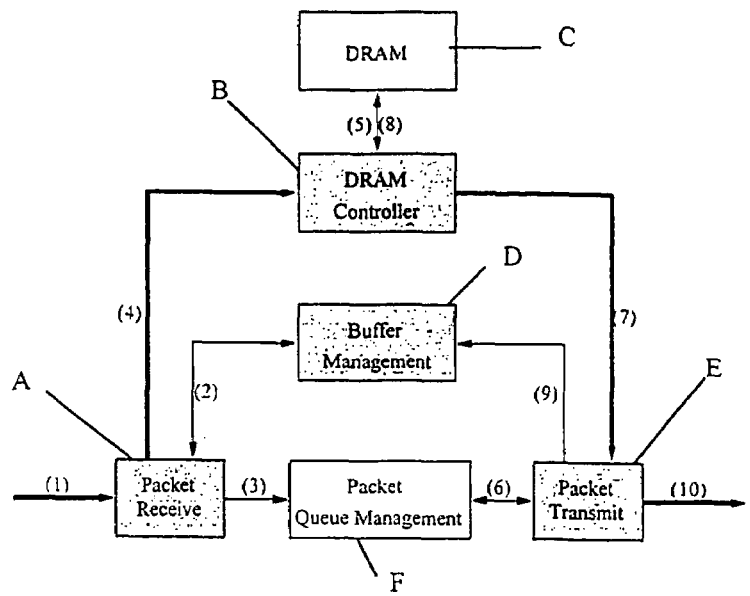
Figure 1 Framework of a Buffering and Queueing subsystem
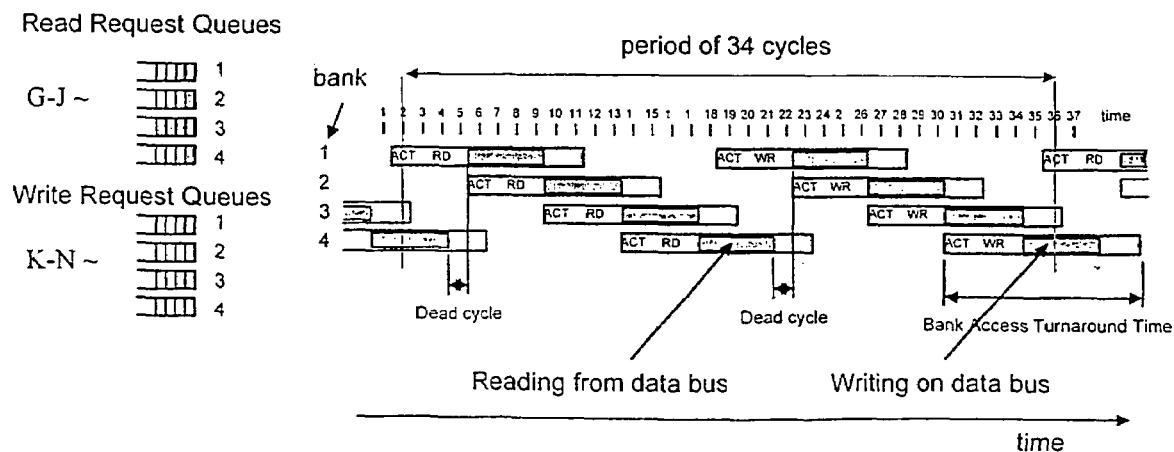
Figure 2 Example of a fixed schedule, with Read- and Write Request Queues, for a single channel with 4 banks.

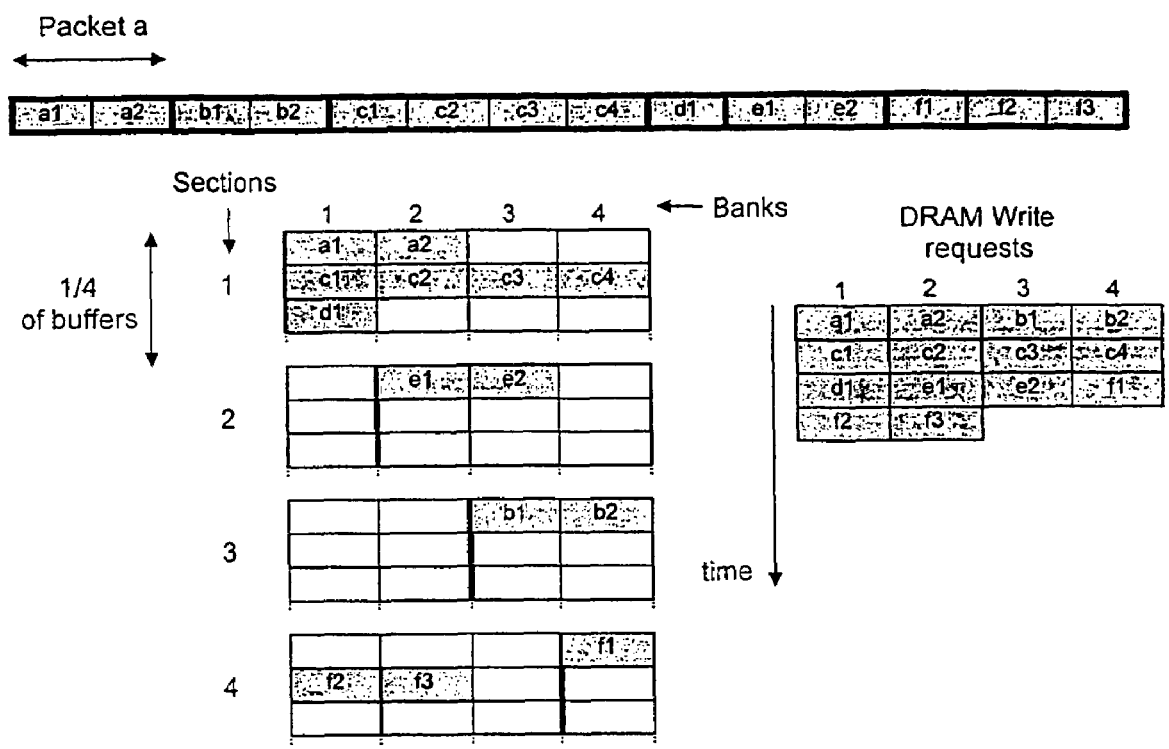
Figure 3 Illustration of bank striping of buffers and incoming packets for a memory system with 4 banks.

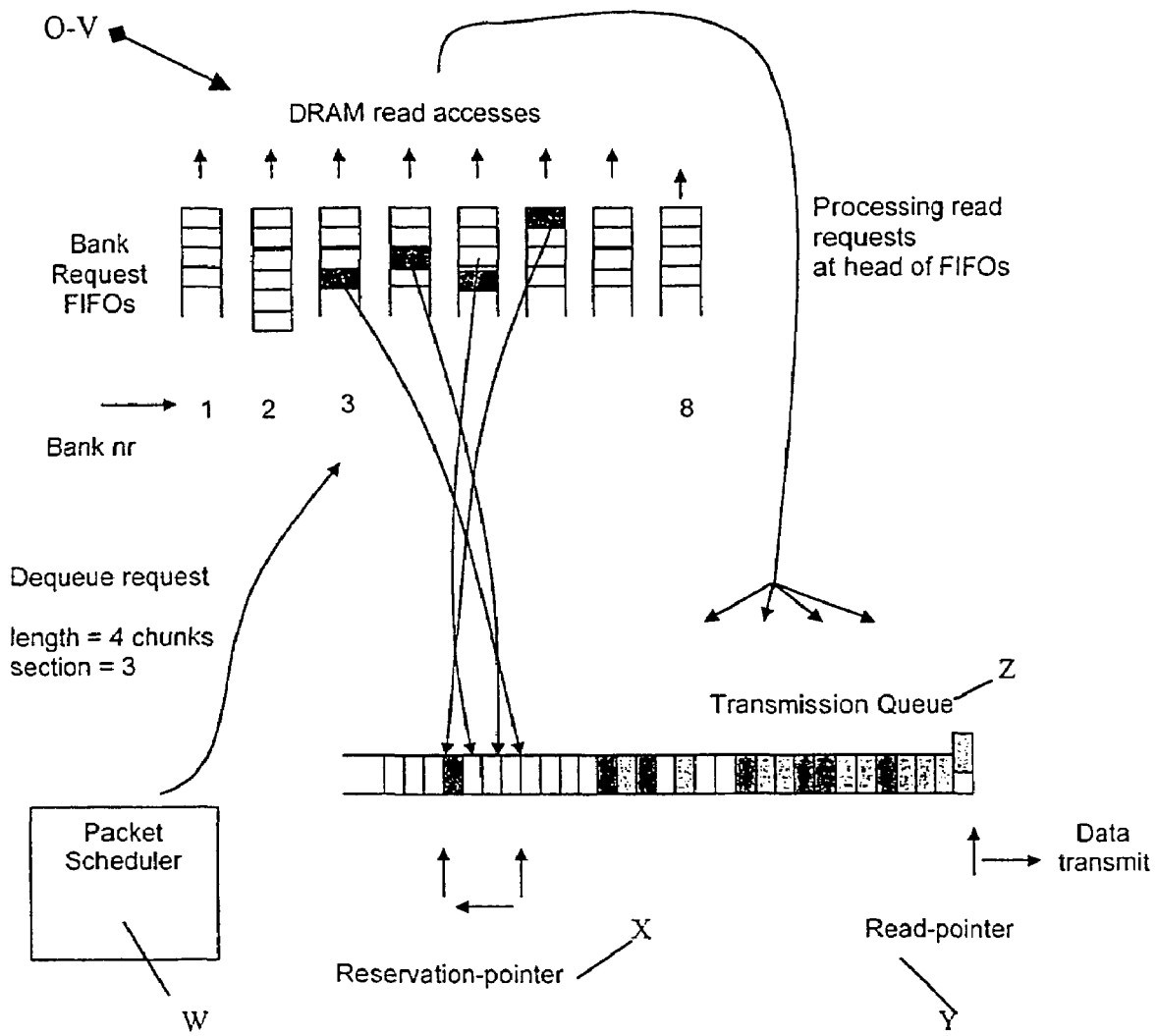
Figure 4 Illustration of operation of Transmission Queue, for a memory system with 8 banks. The scheduler schedules a packet from section 3, length = 4 chunks.

OVERCOMING ACCESS LATENCY INEFFICIENCY IN MEMORIES FOR PACKET SWITCHED NETWORKS

This application claims the benefit of provisional application Ser. No. 60/350,611 filed Nov. 13, 2001.

BACKGROUND

1. Field of the Invention

The present invention relates to memory control and the use of memories, especially in packet switched telecommunications networks and at nodes in such networks.

2. State of the Art

During scheduling of data transfer of a packet switched network a traffic manager needs to buffer quite a large amount of data to allow scheduling in case of heavy traffic and to equalize bursty traffic. Failure to do this can lead to dropping packets. Also, packets do not necessarily leave a node in the same order they arrive which also requires buffering.

The large amount of buffering needed at a packet switched network node can be solved by the use of cost-effective off-chip DRAM-based technology. Use of DRAM is associated with access latency. Regardless of technologies used to increase the bandwidth per pin (such as Double Data Rate (DDR) SDRAM or RAMBUS DRAM (RDRAM)), a main bottleneck in any DRAM implementation is the large bank turnaround time, which is currently around 60 ns. The bank turnaround time limits the frequency of accessing different (random) rows within a single bank, and therefore limits the data bus utilization drastically. For this reason, DRAM chips have multiple banks (typically 2 or 4) to increase the best-case bus usage, but this does not on its own change the worst-case bus usage.

A DRAM channel is defined as a single logical set of address (+ control) and data lines. A single channel has a particular width, which is the number of data lines and can be implemented using multiple DRAM components. A DRAM access cycle is defined as the sequence of operations performed on the address and data lines to do a particular random read or write request. The DRAM access cycle turnaround for a given amount of data is the time it takes between the start of either a random read or write request for that amount of data and the start of the next possible random read or write request. A DRAM bank is defined as a subset of a DRAM channel that has an independent access cycle. For example, if a channel has 4 banks, then up to 4 access cycles can be performed simultaneously. However, all banks within a particular channel share all address, control and data lines.

It is an object of the present invention to provide improved performance of a memory which is subject to access latency.

It is an object of the present invention to provide a memory structure having improved performance and for use in packet switched networks, especially in nodes of such a network.

SUMMARY OF THE INVENTION

One aspect of the present invention is a bank-striping for writing. This may be combined with a method for simultaneous packet de-queuing. This combination may guarantee up to 100% bus utilization efficiency for writing while arbitrarily increasing the statistical performance for reading efficiency. The buffering unit may be advantageously used in a node of a packet switched network, such as a landline packet switched network or a mobile telecommunications network. The term "packet switching" includes systems having variable length packets (e.g. packets sent in accordance with an IP protocol on the Internet) or constant length packets, sometimes called "cells" (e.g. as sent in an ATM system).

The present invention provides a packet buffering unit for a packet switched system comprising:

a packet receive unit for receiving packets from the network and for splitting these packets into packet data units (PDU);

a plurality of memory banks;

a memory controller for striping at least some of the PDUs of a packet over the memory banks;

a packet management unit for retrieving PDUs stored in the memory banks and associated with a packet; and a transmission queue means for at least temporarily storing the retrieved PDUs in the sequence they are to be transmitted. The memory banks are preferably split up into buffers. Where a packet has more data bits than can be stored in one buffer the packet may first be split up into packet segments whereby each segment is able to be buffered in one buffer. Each packet segment is then split up into PDUs. The present invention may also include a packet scheduler for scheduling a packet for transmission. The packet scheduler co-operates with the packet management unit or is a part thereof and the combination provides the complete service of scheduling and retrieving packets for transmission. The packet buffering unit may be implemented in hardware or a mixture of hardware and at least one programmable element such as a PLA, PLA, Gate Array, FGPA, or a microprocessor.

The present invention also includes a method of buffering packets in a packet switched system comprising:

receiving packets from the network and splitting these packets into packet data units (PDUs);

striping at least some of the PDUs of a packet over a plurality of memory banks;

retrieving PDUs stored in the memory banks and associated with a packet, and at least temporarily storing the retrieved PDUs in the sequence they are to be transmitted.

The present invention is particularly advantageous when the bank access turnaround time is non-zero.

The present invention also includes software computer program products for carrying out any of the methods of the present invention when run on a suitable processing engine.

The present invention will now be described with reference to the following drawings.

BRIEF DESCRIPTION OF THE DRAWINGS

FIG. 1 is a schematic representation of a packet handler at a node of a packet switched network.

FIG. 2 is a schematic representation of a fixed rate schedule control mechanism which may be used with the present invention.

FIG. 3 is a schematic representation of a packet buffering process according to an embodiment of the present invention.

FIG. 4 is a schematic representation of a packet transmit process according to an embodiment of the present invention.

DETAILED DESCRIPTION OF THE PREFERRED EMBODIMENTS

Figure 5:
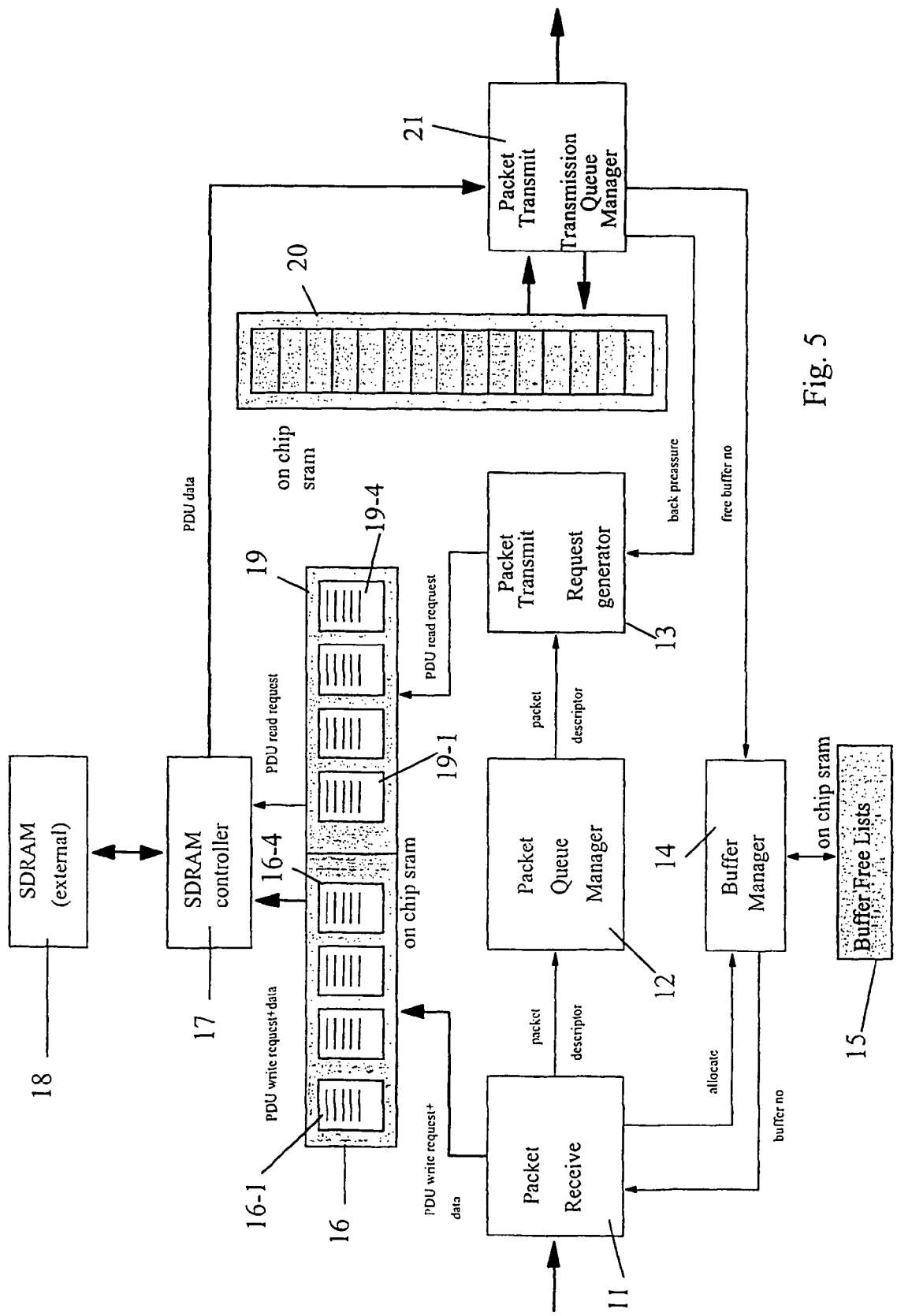
FIG. 5 is a schematic representation of a hardware based packet buffering unit according to an embodiment of the present invention.

The present invention will be described with reference to certain embodiments and drawings but the skilled person will appreciate that the present invention has wider application than these embodiments and drawings which are provided as examples only of the invention.

A buffering subsystem is shown schematically in FIG. 1, e.g. as may be implemented at a node of a packet switched network. The packet switched network may be any packet switched network such as a landline telecommunications network or a mobile radio telecommunications network. Packet switched networks can be divided into those which allow an independent decision of the routing of a packet at each node (datagram system) and those which set up a virtual circuit through the network and deliver packets along these virtual networks (virtual circuit system). Further, packet switched systems may be divided into those which use variable length packets and those which use constant length packets, sometimes called cells. The present invention may find advantageous use with any of the above packet switched systems. No limitation on the types of packet switched system is anticipated which can be used with the present invention. In any such system packets need to be buffered at various places in the system in order to deal with varying transmission rates. Such places may be nodes of a telecommunications network of which switches, routers, base stations, gateways, terminals, servers, user equipment, modems, mobile telephones, repeaters are a non-limiting list. Packets enter the subsystem (1), with additional information such as destination queue. The Packet Receive block (A) requests (2) one or more free buffers from the Buffer Management block (D). The packet gets en-queued (3) by means of a descriptor, for instance, into the Packet Queue Management block (F), while the packet itself is sent (4) to the memory e.g. DRAM, controller (B) which stores (5) it in a memory such as a DRAM (C).

The scheduler (W, see FIG. 4) which may be included within the Packet Queue Management block (F) or may be separate from it schedules a packet for transmission and de-queues the packet descriptor from its data structures. This gets forwarded (6) to the Packet Transmit block (E), which requests (7) the DRAM controller (B) to retrieve (8) the packet from DRAM (C). Subsequently, the buffer or buffers containing the packet are freed (9), and the packet is transmitted (10).

Embodiments of the present invention comprise apparatus and methods to be implemented in the shaded blocks in FIG. 1, but do not necessarily impose any restrictions on DRAM technology or Packet Queue Management mechanisms. Preferably, the scheduling of packets in accordance with the present invention is not influenced, nor is the order of transmitted packets changed from the order in which they have been scheduled. The order in which packets arrive is not necessarily the order in which they are transmitted. In fact, the present invention is particularly useful when the transmit order is not the same as the receive order. Such changes of order can occur when different packets have different priorities, for instance. In such a system high priority packets will be brought forward in the transmission queue compared with packets having lower priorities.

In accordance with a packet storage model in accordance with an embodiment of the present invention, the incoming packets are split into fixed-size chunks or Packet Data Units (PDU) before storage. Embodiments of the present invention can guarantee a fixed rate for writing PDUs to memory, regardless of whether they are from a single-PDU packet or a larger packet. In this way, the fixed rate for storing PDUs is preferably related to the maximum packet arrival rate. Generally, it can be assumed that this maximum rate is provided by minimum-sized packets. The PDU size itself is freely selectable but should preferably be related to the size of a minimum-sized packet, but may be larger.

The memory is organized in banks. All banks on their own can guarantee a rate for writing and reading PDUs to random memory locations within that bank. A bank by this definition maps on a DRAM bank. However, there can be more banks in total when multiple memory channels are used. A PDU is preferably always written or read in one burst. For memory management, the position of a PDU in memory can be the smallest addressable unit called a PDU location. The width of a single DRAM channel is chosen so that the bandwidth provided by the data lines can be maximally used. This takes into account PDU size, number of banks per channel, and the access cycle turnaround time for a PDU size of data. In this way a single channel will offer a certain PDU rate. The number of channels is then chosen to achieve the necessary overall PDU rate, where n channels have a PDU rate of n times the PDU rate of a single channel.

The memory controller itself can be implemented using a fixed schedule but the present invention is not limited thereto. For example, for a conventional packet buffering system, the requirement is that each packet should be stored and retrieved once, and thus writing and reading bandwidth must be equal. A simple fixed schedule that can be developed this way is shown in FIG. 2. In this schedule, the memory controller provides, per bank, a queue for PDUReadRequests and one for PDUWriteRequests as shown in FIG. 2. The queues may be implemented as FIFO registers for read requests (G-J) and write requests (K-N). All queues are emptied at the same speed, e.g. by polling each FIFO G-J and K-N in turn. It is however not necessary that the memory controller implements a schedule like this. The only requirement is that it uses the DRAM memory bandwidth maximally when provided with a bounded backlog of requests in all of these queues. This is the case for this simple scheduler, for a backlog of 1 request in all the request queues. The result of this organization is that the memory of n banks is accessed using n read and n write request queues (G-J, K-N) which store requests for PDU sizes of data, as shown in FIG. 2 for n=4.

Other useful schedules which are examples of schedules which may be used with the present invention include 1 write process combined with 2 read processes or, for example, 2 read processes and 1 write process.

In a buffer organization model in accordance with the present invention, the total amount of buffer space available (which is limited by the total memory available and the buffer size), is divided into n sections of equal size, for a memory system with n banks. Each section has one or more buffers. Sections and buffers are defined in the logical address space of the memory space available. The logical address space maps onto physical memory locations. A single buffer can hold up to a number of PDUs; e.g., m. All buffers are preferably of the same size. The number of PDUs which can be stored in one buffer may be less than the length of the maximum packet length especially in a system which allows variable length packets. In this case a packet is first split up into packet segments, each packet segment having the same or less bits of data as can be stored in one buffer. So if a packet has a length of l PDUs where l is greater than m by p, whereby p is less than m, then the packet is split into two packet segments, the first segment having length m PDUs for instance, and the second segment has a length p. The consecutive PDUs of a buffer are allocated on banks in the memory system, so that only PDU j and PDU j+kn are in the same memory bank, for all k. Without any loss of generality, it is assumed that consecutive PDUs of a buffer are allocated in different memory banks, that is the buffer is striped over the banks. The consecutive PDUs of a buffer may be striped into consecutive banks, for example. Section i can have as property that the first data PDU of section i is stored in bank i.

A separate buffer free-list is maintained per section, e.g. in a suitable register, which holds all free buffers in that section. As long as no free-list is empty, thus indicating that a section is completely filled up, the technique will work as outlined in this document.

As indicated above, for storing an incoming packet, it is first decided if the packet has a length greater than m PDUs. If YES, the packet is first split into packet segments by a packet segment splitting unit which may be implemented in the packet receive unit (A). If NO the packet is used as is. Each packet segment can fit in a single buffer. For every packet segment of the packet, the following procedure is followed when storing the packet. The packet segment is split into PDUs. A buffer is requested from the buffer management unit (D), for that number of PDUs. The buffer management unit (D) keeps track of the section from which it must allocate the next buffer, using the formula i'=(i+k)Mod n, where Mod is the modulus, n is the number of memory banks, k is the number of PDUs in the current packet segment, i the section in which the current packet segment is stored, and i' the section for the next packet segment.

In this way, incoming packets are striped over the memory banks, so that all banks have exactly the same bandwidth of PDUs, regardless of the size of the packet. This has as a consequence that the bandwidth allocated for storing packets is used, in a deterministic way, at full capacity. This is illustrated schematically in FIG. 3. The first packet "a" is split into two PDUs $a_1$ and $a_2$. These are temporarily stored in section 1 of the DRAM and are striped over banks 1 and 2 so that each bank stores one PDU. The next packet "b" has two PDUs $b_1$ and $b_2$. Applying the formula i'=(i+k)Mod n whereby i=1, k=2 and n=4, the result is i'=3, so $b_1$ and $b_2$ are stored in section 3 starting at the next bank not occupied in section 1, i.e. bank 3 and striping the PDUs over the banks, i.e. temporarily storing these in banks 3 and 4. The packet "c" is 5 PDUs long. It is first split into two segments. The first segment is split into 4 PDUs, $c_1$ to $c_4$. Applying i'=(i+k)Mod n with i=3 and k=2 the PDUs $c_1$ to $c_4$ are stored in section 1 (as (3+2)Mod 4=1). As $b_2$ was stored in bank 4, $c_1$ is stored in the next bank 1. The second segment of packet "c" is not split as it represents only one PDU "d", this PDU "d" is stored in the section 1+4, i.e. in the first section again starting at bank 1. The next packet "e" is split into two PDUs which are stored in section 1+1, i.e. 2 starting in the bank immediately after $d_1$, i.e. bank 2.

To retrieve scheduled packets a scheduler (W, FIG. 4) independently orders the outgoing packets at its own rate, the scheduling-rate, which may not be a fixed rate, and it is assumed that the actual rate is not correlated to the packet length of the packet that is being scheduled. This scheduler may be included with the unit as shown in FIG. 1 or may be external thereto. In the general case, the transmit order of packets differs from the incoming order of packets. For instance, it can be assumed that it is pseudo-random, and the length of subsequent packets that are scheduled is uncorrelated.

Every scheduling decision eventually results in a series of PDUReadRequests for contiguous banks, since the packet was stored that way. However, the PDUReadRequests of subsequent scheduled packets are, in the general case, not contiguous.

It is also assumed that there is no correlation between the section and the packet length (this is true if there is no correlation between the packet lengths of two consecutive incoming packets). Under these assumptions, it follows that statistically the PDUReadRequests are uniformly distributed over the banks.

Therefore, to increase the probability that all bank read-request-queues are not empty, it is preferred if the number of packets that have been scheduled and have submitted their PDUReadRequests in these queues. This can be implemented using the architecture shown in FIG. 4. A Transmission Queue (Z) is used which may be implemented as a register and which holds packet data before it is sent out. The Queue has a read-pointer (Y) and a reservation-pointer (X), and each queue-element of the bank related queues (O-V) can hold one PDU of data. Each of these queues (O-V) may be implemented as a FIFO register. In total, the queue can hold up to N PDUs of data. For the k PDUs of a packet that has been scheduled, k queue-elements are reserved in the Transmission Queue at the location of the reservation-pointer (X). The reservation-pointer is then increased with k PDUs. If the queue has not enough free room, i.e. when read-pointer–reservation-pointer<k, then the scheduler (W) suspends scheduling until there is enough free room. Next, every PDU of the packet is translated into a PDUReadRequest that holds a pointer to the corresponding queue-element in the transmission queue (Z). When the PDU is retrieved from memory, it is written in the queue into this queue-element. The read-pointer (Y) points to the queue-element that corresponds to the PDU that needs to be transmitted next. If the queue-element already holds the PDU, it is transmitted, and the read-pointer is increased with 1. Otherwise the transmission stalls, until the PDU is available.

When the scheduler (W) schedules long packets or the transmission at the read-pointer stalls, the number of reserved queue-elements (between read- and reservation-pointer) increases. In that case, more PDUReadRequests are in the memory read-request queues, and thus the probability increases that the memory read subsystem increases its efficiency. Increasing the size of the Transmission Queue, N, increases the limit of simultaneous read-requests, and thus increases the overall performance of the system.

The present invention may be implemented in hardware or, for example, in software using a processing engine such as a microprocessor or a programmable logic device (PLD) such as a PLA (programmable logic array), PAL (programmable array logic), FPGA (field programmable gate array). Examples of such implementations are provided below for purposes of illustration only.

An example of a hardware unit is shown in FIG. 5 configured as a receiver/transmitter circuit in accordance with an embodiment of the present invention. The circuit may be constructed as a VLSI chip. Three on-chip static RAMs (SRAMs) may be used to provide buffering of the transmission queue 20, the bank request FIFOs 16 and to hold the buffer free list per bank 15. Packets are received by the packet receive block 11. If the packet is larger than the memory space in one buffer, this block 11 splits the packet into packet segments. This block 11 also splits the packet segments (or packets if they are small enough) into PDUs. The block 11 requests one buffer per packet segment from the buffer manager block 14 which retrieves information about free buffers from the buffer free list memory 15 and allocates a free buffer. The packet receive block 11 sends the PDUs accompanied by a PDU location address to the bank request FIFOs 16. The controller 17 for the off-chip memory, e.g. an SDRAM 18, fetches these PDUs from the FIFOs 16 in accordance with a schedule. For example, the controller 17 can pole each FIFO 16-1 ... 16-4 in turn. The controller 16 writes these PDUs into the external memory 18 in accordance with the methods of the present invention, i.e. it stripes the PDUs of one packet or one packet segment into the memory banks in the external memory 18. A packet descriptor is sent to the packet queue manager 12 from the packet receive unit 11. The packet queue manager 12 passes packet descriptors to the packet transmit request generator 13. The order of passing these requests may be different from the receive order of the packets, e.g. the transmission order may be determined by packet priorities. The packet transmit generator 13 increments (or decrements) the reservation pointer of the transmission queue in the on-chip SRAM 19 and generates PDU requests to the bank request FIFOs 19. The controller 17 fetches the requests from the bank FIFOs 19 in accordance with a schedule, e.g. it polls each of the FIFOs 19-1 . . . 19-4 in turn. The controller 17 issues the requests and sends the PDU data to the packet transmission queue manager 21. This manager 21 writes the PDU data in the correct transmission order in the PDU memory 20. The manager 21 maintains an incrementing (or decrementing) read pointer to retrieve the packet data from the PDU memory 20 for transmission. When the PDU memory 20 gets full, it slows down the request generator 13. When all the data of a packet buffer have entered the transmission queue manager, the corresponding buffer is freed.

Figure 6:
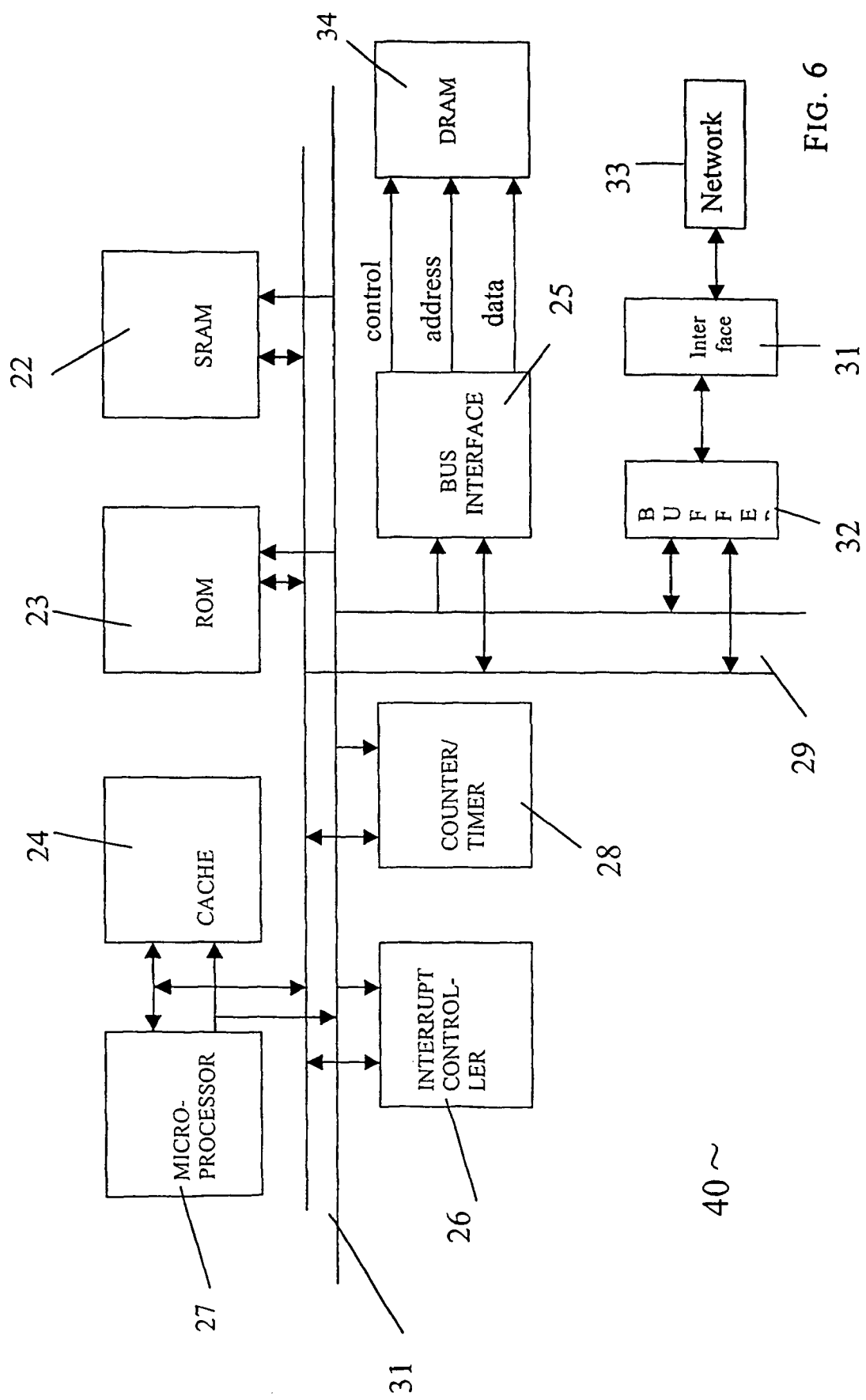
FIG. 6 is a schematic representation of a software based packet buffering unit according to yet another embodiment of the present invention.

Another example of a circuit in accordance with an embodiment of the present invention will be described with reference to FIG. 6 for a receiver/transmitter circuit 40. This circuit 40 may be constructed as a VLSI chip around an embedded microprocessor 27 such as an ARM7TDMI core designed by ARM Ltd., UK which may be synthesized onto a single chip with the other components shown. A zero wait state SRAM memory 22 may be provided on-chip as well as a cache memory 24. The SRAM memory 22 may be used for providing the various queues, registers and FIFO read and write queues described above although itself not being large enough to store the packet data. The interface to packet switched network 33 is provided by block 31. Packet data received by block 31 is passed to the processor 27 for processing. An on-chip buffer 32 may be used to decouple the processor 27 from data transfer through the interface 31. A counter/timer block 28 may be provided as well as an interrupt controller 26. Software programs may be stored in an internal ROM (read only memory) 23. Access to the off-chip (DRAM) memory banks 34 may be provided through an external bus interface 25 with address, data and control busses. The various blocks of circuit 40 are linked by suitable busses 30.

The buffer control mechanisms of the present invention may be implemented as software to run on processor 27. The procedures described above may be written as computer programs in a suitable computer language such as C and then compiled for the specific processor in the embedded design. For example, for the embedded ARM core VLSI described above the software may be written in C and then compiled using the ARM C compiler and the ARM assembler.

Accordingly, the present invention also includes software computer program products for carrying out any of the methods of the present invention when run on a suitable processing engine as well as data carriers for storing executable computer programs for carrying out any of the methods of the present invention. However, it is important that those skilled in the art will appreciate that the mechanisms and methods of the present invention are capable of being distributed as a program product in a variety of forms, and that the present invention applies equally regardless of the particular type of signal bearing media used to actually carry out the distribution. Examples of computer readable signal bearing media include: recordable type media such as floppy disks and CD ROMs and transmission type media such as digital and analogue communication links.

While the invention has been shown and described with reference to preferred embodiments, it will be understood by those skilled in the art that various changes or modifications in form and detail may be made without departing from the scope and spirit of this invention.

The invention therefore may be understood and described as a packet buffering unit for a packet switched system comprising:

a packet receive unit for receiving packets from the network and for splitting these packets into Packet Data Units (PDUs);

a plurality of memory banks;

a memory controller for striping at least some of the PDUs of a packet over the memory banks;

a packet management unit for retrieving PDUs stored in the memory banks and associated with a packet; and transmission queue memory means for at least temporarily storing the retrieved PDUs in the sequence they are to be transmitted.

The invention is further understood as comprising a packet scheduler for scheduling a packet for transmission.

The packet buffering unit may also further comprise n memory banks, wherein the striping means stripes the PDUs over the memory banks in accordance with n memory sections, each memory section comprising memory space from each memory bank, and the striping means allocates PDUs to each section in accordance with $i'=(i+k) \bmod n$ where Mod is the modulus, n is the number of memory banks, k is the number of PDUs in a current packet, i is the section in which the current packet is stored, and i' the section for PDUs of the next packet.

Preferably, the striping means of the packet buffering unit allocates consecutive PDUs allocated to a buffer in consecutive memory banks and section i has as property that the first PDU to be stored in section i is stored in bank i.

The packet buffering unit may further comprise a read request memory means for storing requests for PDUs stored in the memory banks.

The read request memory means may be configured as a FIFO.

The packet buffering unit can further comprise a read request generator for generating read requests.

The packet management unit of the packet buffering unit as set forth above may further include a transmission queue manager for writing the retrieved PDUs in the sequence they are to be transmitted into the transmission queue memory means.

In addition, the PDUs of a packet are striped over the memory banks are associated with buffer, and the packet buffering unit further comprises a buffer management unit for allocating a free buffer for PDUs of a packet.

The packet receive unit preferably comprises means for splitting a packet into packet segments if the packet is longer than can be stored in one buffer.

The packet receive unit further comprises means for splitting a packet segment into PDUs.

The packet receive unit also further comprises means for generating a PDU location address for each PDU.

The packet buffering unit further preferably includes a write request memory means for storing the PDU location address and the PDU.

The write request memory means may be configured as a FIFO.

The packet buffering unit described above may be used in a node of a packet switched network.

The packet switch network in which the packet buffering unit is used can support different length data packets.

The invention may also be understood and described as a method of buffering packets in a packet switched system comprising:
- receiving packets from the network and splitting these packets into PDUs;
- striping the data at least some of the PDUs of a packet over a plurality of memory banks;
- retrieving relevant data PDUs stored in the memory banks, and
- at least temporarily storing the retrieved PDUs in the sequence they are to be transmitted.

The method may further comprise striping the PDUs over memory banks in accordance with n memory sections, each memory section comprising memory space from each memory bank, and allocating PDUs to each section in accordance with $i'=(i+k) \bmod n$ where Mod is the modulus, n is the number of memory banks, k is the number of PDUs in a current packet, i is the section in which the current packet is stored, and i' the section for PDUs of the next packet.

The method may further be described as further comprising allocating consecutive PDUs allocated to a buffer in consecutive memory banks, where section i has as a property that the first data PDU to be stored in section i is stored in bank i.

The methods of the invention may be implemented in a node of a packet switched network which is adapted to execute the methods.

What is claimed is:

1. A packet buffering unit for a packet switched system comprising:
    a packet receive unit for receiving packets from the network and for splitting these packets into Packet Data Units (PDUs);
    a plurality of memory banks coupled to said packet receive unit;
    a memory controller coupled to said packet receive unit and said plurality of memory banks for storing at least some of the PDUs of a packet over the memory banks;
    a packet management unit coupled to said packet receive unit for retrieving PDUs stored in the memory banks; and
    transmission queue memory means coupled to said packet management unit for at least temporarily storing the retrieved PDUs in the sequence they are to be transmitted;
    wherein the plurality of memory banks includes n memory banks partitioned into s number of memory sections, each memory section comprising memory space from each memory bank, and the memory controller stores PDUs in each section in accordance with $i'=(i+k) \bmod n$, where n is the number of memory banks, k is the number of PDUs in a current packet, i is the section in which the current packet is stored, and i' is the section for PDUs of the next packet.

2. A packet buffering unit according to claim 1, further comprising:
    a packet scheduler for scheduling a packet for transmission.

3. A packet buffering unit according to claim 1, wherein:
    the memory controller stores consecutive PDUs in consecutive memory banks and section i has as property that the first PDU to be stored in section i is stored in bank i.

4. A packet buffering unit according to claim 3, further comprising:
    a read request memory means for storing requests for PDUs stored in the memory banks.

5. A packet buffering unit according to claim 4, wherein:
    the read request memory means is configured as a FIFO.

6. A packet buffering unit according to claim 5, further comprising
    a read request generator coupled to said read request memory means for generating read requests.

7. A packet buffering unit according to claim 6, wherein:
    the packet management unit comprises a transmission queue manager for writing the retrieved PDUs in the sequence they are to be transmitted into the transmission queue memory means.

8. A packet buffering unit according to claim 7, further comprising:
    a PDU buffer, and a buffer management unit coupled to the PDU buffer for allocating the buffer for PDUs of a packet.

9. A packet buffering unit according to claim 1, wherein:
    the packet receive unit includes means for generating a PDU location address for each PDU.

10. A packet buffering unit according to claim 9, further comprising:
    a write request memory means coupled to said packet receive unit for storing the PDU location address and the PDU.

11. A packet buffering unit according to claim 10, wherein:
    the write request memory means is configured as a FIFO.

12. A packet buffering unit according to claim 1, wherein the packets are not of uniform length.

13. A method of buffering packets in a packet switched network comprising:
    receiving packets from the network;
    splitting these packets into PDUs;
    storing at least some of the PDUs of a packet over a plurality of memory banks;
    retrieving PDUs stored in the memory banks; and
    at least temporarily storing the retrieved PDUs in the sequence they are to be transmitted;
    wherein the plurality of memory banks includes n memory banks partitioned into s number of memory sections, each memory section comprising memory space from each memory bank, and the storing of PDUs over the plurality of memory banks stores PDUs in each section in accordance with $i'=(i+k) \bmod n$, where n is the number of memory banks, k is the number of PDUs in a current packet, i is the section in which the current packet is stored, and i' is the section for PDUs of the next packet.

14. A method according to claim 13, further comprising:
    storing consecutive PDUs in consecutive memory banks, wherein section i has as property that the first PDU to be stored in section i is stored in bank i.

* * * * *

UNITED STATES PATENT AND TRADEMARK OFFICE
CERTIFICATE OF CORRECTION

PATENT NO. : 7,653,072 B2 Page 1 of 1
APPLICATION NO. : 10/494848
DATED : January 26, 2010
INVENTOR(S) : Deforche et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1545 days.

Signed and Sealed this

Twenty-third Day of November, 2010

David J. Kappos
*Director of the United States Patent and Trademark Office*